United States Patent
Swift et al.

(10) Patent No.: US 7,500,599 B2
(45) Date of Patent: *Mar. 10, 2009

(54) SUSPICIOUS PERSONS DATABASE

(75) Inventors: Amy Swift, Frisco, TX (US); Mark Wallin, Sugar Land, TX (US); Lance Pate, Victoria, TX (US)

(73) Assignee: First Data Corporation, Greenwood Village, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/778,519

(22) Filed: Jul. 16, 2007

(65) Prior Publication Data

US 2008/0011824 A1 Jan. 17, 2008

Related U.S. Application Data

(63) Continuation of application No. 10/813,915, filed on Mar. 31, 2004, now Pat. No. 7,246,740.

(60) Provisional application No. 60/460,836, filed on Apr. 3, 2003.

(51) Int. Cl.
*G07F 19/00* (2006.01)
(52) U.S. Cl. ................ 235/379; 235/380; 235/382; 235/383
(58) Field of Classification Search ............. 235/379, 235/380, 382, 383, 449, 487, 493; 705/42–44
See application file for complete search history.

(56) References Cited

U.S. PATENT DOCUMENTS

| | | | |
|---|---|---|---|
| 5,513,272 A | 4/1996 | Bogosian, Jr. | |
| 5,679,938 A | 10/1997 | Templeton et al. | |
| 5,679,940 A | 10/1997 | Templeton et al. | |
| 5,930,777 A | 7/1999 | Barber | |
| 6,328,207 B1 * | 12/2001 | Gregoire et al. | 235/379 |
| 6,505,772 B1 | 1/2003 | Mollett et al. | |
| 6,547,132 B1 | 4/2003 | Templeton et al. | |
| 6,578,760 B1 | 6/2003 | Otto | |
| 6,581,043 B1 | 6/2003 | Wallin et al. | |
| 6,758,394 B2 | 7/2004 | Maskatlya et al. | |
| 6,957,770 B1 | 10/2005 | Robinson | |
| 2003/0093368 A1 | 5/2003 | Manfre et al. | |

(Continued)

FOREIGN PATENT DOCUMENTS

WO WO 01/97134 12/2001

(Continued)

*Primary Examiner*—Seung H Lee
(74) *Attorney, Agent, or Firm*—Sutherland Asbill & Brennan LLP

(57) ABSTRACT

Most financial transactions involving check deposits and cashing at automatic teller machines are often associated with high risk. Although conventional security measures for many automatic teller machines record financial transactions, the recorded events are typically viewed after suspicious or criminal activity has already occurred. Therefore, a financial institution may not know in advance whether requested financial transactions are of suspicious or fraudulent intent. The present teachings relate to a method of scoring customers prior to authorization in a manner so as to identify suspicious behavior or suspicious activity. The method also relates to marking suspicious individuals by storing related transaction information, such as biometric data, in a database for purposes of verifying identification information and scoring the validity of future financial transactions.

13 Claims, 7 Drawing Sheets

U.S. PATENT DOCUMENTS

| | | |
|---|---|---|
| 2003/0130919 A1 | 7/2003 | Templeton et al. |
| 2003/0216987 A1 | 11/2003 | Mollett et al. |
| 2003/0216988 A1 | 11/2003 | Mollett et al. |
| 2003/0217014 A1 | 11/2003 | Mollett et al. |
| 2003/0225686 A1 | 12/2003 | Mollett et al. |
| 2004/0139014 A1 | 7/2004 | Song et al. |
| 2004/0234117 A1 | 11/2004 | Tibor |

FOREIGN PATENT DOCUMENTS

| | | |
|---|---|---|
| WO | WO 03/042790 | 5/2003 |
| WO | WO 03/083751 | 10/2003 |

* cited by examiner

SUSPICIOUS PERSONS DATABASE

RELATED APPLICATIONS

This application is a continuation of U.S. application Ser. No. 10/813,915, filed on Mar. 31, 2004 and claims the benefit of U.S. Provisional Application No. 60/460,836, filed Apr. 3, 2003, the entirety of which are hereby incorporated herein by reference.

BACKGROUND OF THE INVENTION

1. Field of the Invention

The present invention relates to financial transactions and, in particular, to a system and method of identifying and logging suspicious behavior or suspicious activity during financial transactions.

2. Description of the Related Art

Typical checking transactions involve depositing or cashing paper drafted checks, such as personal, business, government, and payroll checks. In some situations, customers or check presenters utilize a checking service provider, such as a check cashing service, to deposit or cash paper drafted checks, or, for example, they may utilize a check cashing service for convenience. Currently, to improve the convenience of depositing or cashing checks and to reduce the cost associated with depositing or cashing checks, checking service providers have increasingly reduced human interaction at the point of transaction with unmanned transaction terminals. Examples of unmanned transaction terminals include automatic teller machines (ATMs), advanced function kiosks, and interactive point of sale (POS) devices. The unmanned transaction terminals may be remotely located some distance from the check cashing services, and thus may not be physically monitored.

As a result, unmanned transaction terminals may be subject to suspicious behavior or suspicious activity, such as bouncing checks, cashing fraudulently acquired checks, assuming another person's identity, and falsifying documents. For example, a customer may attempt to cash a check belonging to another individual, or the customer may attempt to draw funds from an account having insufficient funds. In some circumstances, security measures are adopted to deter suspicious behavior or suspicious activity. Current security measures for many unmanned transaction terminals include video surveillance such that the video cameras are configured to record financial transactions, including depositing or cashing of paper drafted checks. Unfortunately, the video recorded financial transactions are typically viewed after suspicious behavior or suspicious activity has already occurred. Thus, a checking service provider may not know in advance whether the requested financial transaction is of suspicious intent.

In certain high risk environments, it may be necessary to issue a high number of risk based declines to protect the check cashing service from high returned check rates, delinquent checking accounts, and fraud. Unfortunately, issuing a high number of risk based declines may result in customers becoming upset in situations where legitimate check related deposits are declined or temporarily held in abeyance due to previously adverse check depositing or writing histories, which can sometimes be difficult to overcome. Also, issuing a high number of risk based declines may reduce revenue by turning away customers that may have engaged in suspicious behavior or suspicious activity in the past but, for the most part, pay returned check service fees. Moreover, due to security concerns and the associated risk of accepting paper drafted checks, issuing a high number of risk based declines may adversely impact the ability of the checking service provider to conduct business in particular neighborhoods or communities, wherein customers that are consistently declined may choose to utilize a different checking service provider. Thus, the lack of flexibility to quickly identify suspicious behavior or suspicious activity by conventional unmanned transaction terminals may require significant improvement.

From the foregoing, it will be appreciated that there is a need for a process by which the checking service provider can more effectively accept check deposits from documented and undocumented customers. To this end, there currently exists a need to more accurately identify suspicious behavior or suspicious activity at the point of transaction so as to better serve many customers and to substantially avoid customers with delinquent and insufficiently funded accounts, fraudulent deposits, counterfeit checks, and high returned check rates. By more accurately identifying suspicious customers, financial institutions, such as checking service providers, can improve customer relations, increase revenue, and confidently decline transactions involving suspicious behavior or suspicious activity.

SUMMARY OF THE INVENTION

The present teachings describe one or more methods and systems for identifying suspicious behavior or suspicious activity during financial transactions using a suspicious persons database. In one embodiment, the aforementioned needs may be satisfied by a method of processing financial transactions from a customer at an unmanned location, wherein the method may comprise acquiring identification information from the customer and determining whether the customer has previously engaged in suspicious behavior or suspicious activity by comparing the customer's identification information to information stored in a suspicious persons database. In addition, the method may comprise retrieving a score indicative of a level of suspicion if the customer has previously engaged in suspicious behavior or suspicious activity and, further, authorizing one or more financial transactions for the customer if the score is below a pre-selected threshold.

In one aspect, acquiring identification information may comprise acquiring biometric information from the customer, check presenter, or check depositor, wherein the biometric information may include some form of biometric sample or data related to the customer. For example, biometric information, data, or sample may include image, photograph, fingerprint, handprint, voice sample, handwriting sample, iris scan, retina scan, or various other generally known biometric or biomedically implanted information useful for identifying the customer or check presenter. Also, comparing the customer's identification information to information stored in the database may comprise comparing the customer's biometric information to previously stored biometric information in the suspicious persons database.

In another aspect, the method may further comprise contacting a customer service agent if the customer's biometric information matches at least one of the previously stored biometric information in the suspicious persons database. Moreover, the method may still further comprise verifying the identity of the customer by the customer service agent if the customer's biometric information matches previously stored biometric information in the suspicious persons database. The method may still further comprise declining financial transactions for the customer if the customer service agent determines that the customer is engaging in suspicious behavior or suspicious activity. The method may further comprise contacting a customer service agent if the score is above the pre-selected threshold. The method may further comprise verifying the score by the customer service agent if the score is above the pre-selected threshold and/or declining the financial transaction by the customer service agent if the score is above the pre-selected threshold. Moreover, the suspicious persons database can be utilized to identify and track suspicious behavior or suspicious activity during a financial transaction.

In another embodiment, the aforementioned needs may also be satisfied by a method of processing financial transactions at an unmanned location, wherein customers submit checks in exchange for cash. The method may comprise acquiring information relating to the financial transactions and the customers, creating records of customers that engage in suspicious behavior or suspicious activity, wherein the records comprise scores indicative of a level of suspicion, and approving financial transactions from customers that have scores below a preset threshold of suspicious behavior or suspicious activity. The method may further comprise declining financial transactions from customers that have scores above a preset threshold of suspicious behavior or suspicious activity.

In still another embodiment, the aforementioned needs may be satisfied by a method of identifying suspicious individuals in financial transactions at an unmanned location. The method may comprise tracking suspicious individuals with scores indicative of a level of suspicion, acquiring biometric information of the suspicious individuals, and storing the scores and the biometric information as records in a database. In addition, the method may further comprise identifying suspicious individuals when processing financial transactions by comparing either the biometric information or the scores to the suspicious individuals during financial transactions and declining financial transactions for suspicious individuals if the scores are above a pre-set threshold. The method may still further comprise declining the transaction request if suspicious behavior or suspicious activity is suspected.

In still another embodiment, the aforementioned needs may be satisfied by a method of processing financial transactions that transpire in an unmanned environment. The method may comprise receiving transaction information from a plurality of customers, creating records of customers that engage in suspicious behavior or suspicious activity, and identifying suspicious behavior or suspicious activity in financial transactions by comparing the received transaction information to the records so as to identify suspicious behavior or suspicious activity. In addition, the method may further comprise approving the financial transactions if suspicious behavior or suspicious activity is not suspected and declining financial transactions if suspicious behavior or suspicious activity is suspected. The method may still further comprise creating records of customers, generating scores indicative of a level of suspicion, and scoring the customers based on a degree of demonstrated suspicious behavior or suspicious activity.

The aforementioned needs may be satisfied by a method of identifying suspicious behavior or suspicious activity in a financial transaction at an unmanned location. The method may comprise receiving transaction requests from suspicious individuals and non-suspicious or registered individuals at the unmanned location, creating records of suspicious individuals having scores indicative of a level of suspicion, and comparing the scores of suspicious and non-suspicious individuals to a preset threshold of suspicion so as to identify suspicious behavior or suspicious activity. In addition, the method may comprise approving the transaction requests if suspicious behavior or suspicious activity is not suspected and declining the transaction request if suspicious behavior or suspicious activity is suspected.

The aforementioned needs may also be satisfied by a system for processing financial transactions from customers at an unmanned location. In one embodiment, the system may comprise an interactive component positioned at the unmanned location, wherein the interactive component is configured to obtain transaction information relating to the financial transactions and the customers, a storage component that records financial transactions of customers that demonstrate suspicious behavior or suspicious activity along with a score based on a level of suspicion and biometric information of the customer, and a processing component that receives the transaction information from the interactive component and identifies suspicious behavior or suspicious activity relating to the financial transactions by either comparing the received transaction information to previously recorded scores or biometric information in the storage component.

The aforementioned needs may also be satisfied by a system for authorizing financial transactions at an unmanned location, wherein a customer submits a check in exchange for cash. In one embodiment, the system may comprise an input device positioned at the unmanned location, wherein the input device is configured to obtain check identification information from the check, identification information from the customer, and biometric information from the customer. In addition, the system may comprise a database configured to store at least the biometric information and a processor configured to receive the identification information from the input device and identify suspicious behavior or suspicious activity relating to the financial transaction and/or the customer prior to cashing the check by at least comparing the received biometric information to previously recorded biometric information in the database.

These and other aspects, advantages, and novel features of the invention will become apparent upon reading the following detailed description and upon reference to the accompanying drawings. In the drawings, similar elements have similar reference numerals.

DETAILED DESCRIPTION OF THE PREFERRED EMBODIMENT

Figure 1:
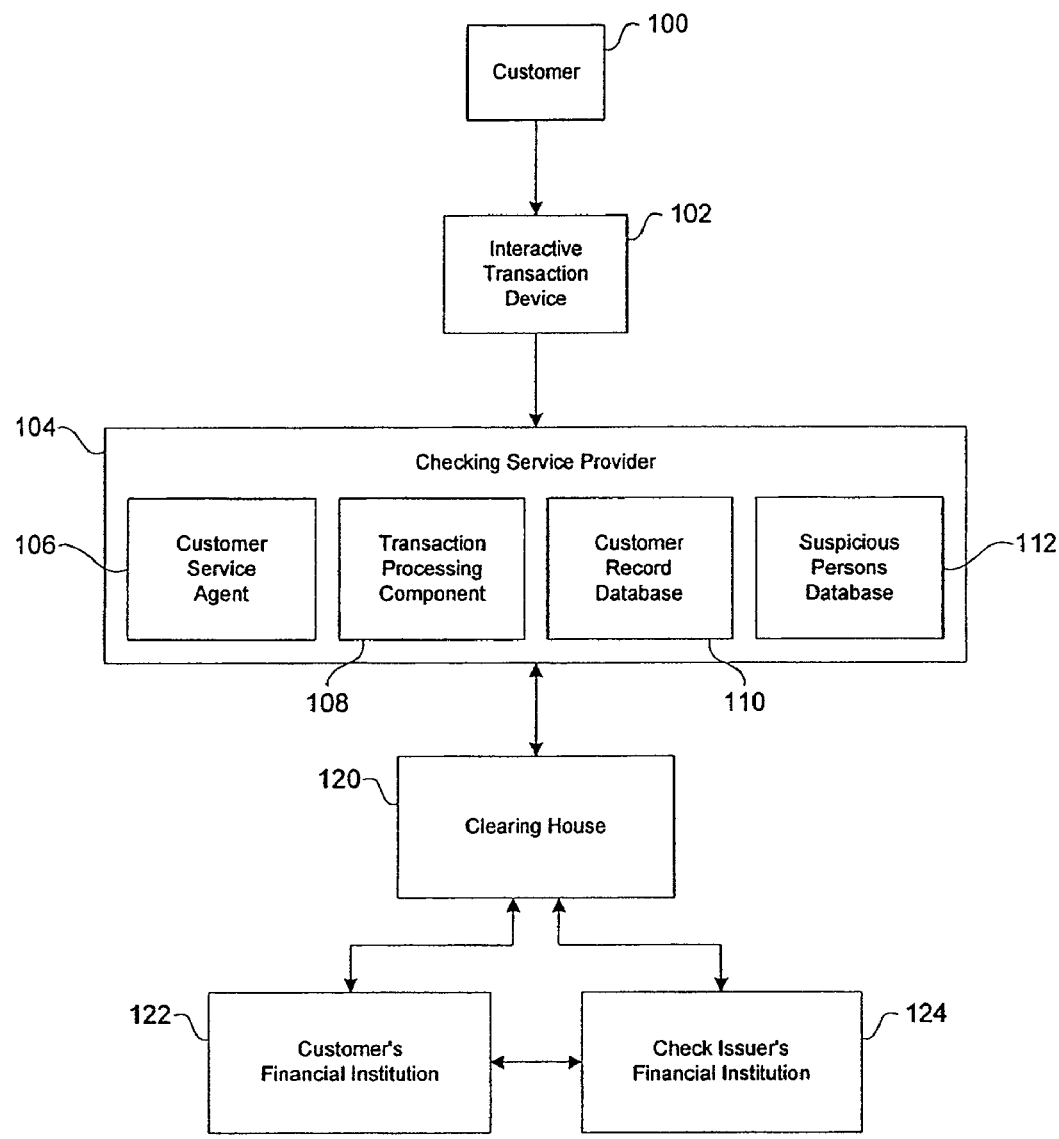
FIG. 1 illustrates one embodiment of a financial transaction involving a customer, an interactive transaction device, a check cashing service having a suspicious persons database, and plurality of financial institutions.

Reference will now be made to the drawings, wherein like numerals refer to like parts throughout. FIG. 1 illustrates one embodiment of a financial transaction involving a customer 100, an interactive transaction device 102, and a checking service provider 104. In addition, FIG. 1 further illustrates a plurality of financial institutions that may be involved in the financial transaction including a clearing house 120, such as the Federal Clearing House (FCH) or Automated Clearing House (ACH), a customer's financial institution 122, and a check issuer's financial institution 124. In one aspect, it should be appreciated that the financial institutions as described herein may be referred to as or include financial entities, organizations, systems, banks, various banking institutions, etc. without departing from the scope of the present teachings. It should also be appreciated that the customer 100 may be referred to as or include a check presenter or check depositor without departing from the scope of the present teachings. Moreover, it should also be appreciated that the customer's financial institution 122 and the check issuer's financial institution 124 may be one in the same without departing from the scope of the present teachings.

In one embodiment, the interactive transaction device 102 may comprise an automatic teller machine (ATM), an advanced function kiosk, or a point of sale (POS) device. The interactive transaction device 102 may be located at various merchant locations, such as retailers, convenience stores, check cashing service locations, gas stations, etc. In addition, the interactive transaction device 102 may also comprise an unmanned terminal, such as an ATM machine, that may be remotely located some distance from one or more of the financial institutions. Various methods of check cashing and depositing may involve the checking service provider 104 or check guarantor, which provides access to the interactive transaction devices 102, a customer 100, such as a depositor or check casher, and one or more of the financial institutions 120, 122, 124. In addition, it should be appreciated that the interactive transaction device 102 may comprise a plurality of interactive transaction devices 102 without departing from the scope of the present teachings. It should also be appreciated that the checking service provider 104 may comprise a check cashing service.

In one embodiment, the interactive transaction device 102 may be equipped with various data acquisition components, such as a check reader, magnetic card reader, and a keyboard. The check reader component of the interactive transaction device 102 may be used to identify, by either magnetic ink character recognition (MICR) or optical character recognition (OCR), the customer's name and signature, an account number, a check amount, a check date, and the American Banking Association (ABA) routing number printed on the face of the paper drafted check. The keyboard component may be used by the customer 100 to input other identification information, such as a social security number and a driver's license number. The magnetic card reader may be used to scan an ATM card or a driver's license for identification purposes. It should be appreciated that further description relating to interactive POS devices are described in the Applicant's co-pending U.S. Patent Application entitled "Data Validation Systems and Methods for Use in Financial Transactions" application Ser. No. 10/671,000, which is hereby incorporated by reference in its entirety.

In addition, the interactive transaction device 102 may be configured to accept biometric information related to the customer 100. In one embodiment, the interactive transaction device 102 may be configured to acquire various types of biometric information, such as data or sample including an image, photograph, fingerprint, handprint, voice sample, handwriting sample, iris scan, retina scan, or various other generally known biometric or biomedically implanted information useful for identifying the customer, check depositor, or check presenter. For example, a photograph of the customer or check presenter 100 may be captured by a camera and included as part of the transaction record for verification of the customer's identity. Alternatively, a fingerprint may be scanned by a fingerprint capturing device and included in the transaction record. Additional information related to biometric information and the acquisition thereof is described in greater detail in the Applicant's co-pending U.S. Patent Application entitled "Systems and Methods for obtaining Biometric Information at a Point of Sale" application Ser. No. 10/731,519, which is hereby incorporated herein by reference in its entirety.

Subsequently, the identification information may be packaged, either electronically or otherwise, in a transaction request file and submitted to the checking service provider 104 for authorization. In one aspect, it should be appreciated that the transaction request file may be electronically generated utilizing generally known electronic check conversion technology. Upon authorization, the transaction may be electronically transferred through a clearing process such that the checking service provider 104 uses the acquired identification information in the transaction request to request a transfer funds through the clearing house 120, such as the FCH or ACH. In one aspect, if the transaction request is determined to be valid by the check issuer's financial institution 124, then the payment "clears" and the amount indicated in the transaction request may be debited from the check issuer's account in the credit issuer's financial institution 124 and credited to the customer's account in the customer's financial institution 122. It should be appreciated by those skilled in the art that various other generally known clearing processes may be utilized without departing from the scope of the present teachings.

As further illustrated in FIG. 1, the checking service provider 104 may include a customer service agent 106, a transaction processing component 108, a customer record database (CRD) 110, and a suspicious person database (SPD) 112. In one aspect, the customer record database 110 includes records of customers who have signed up for check cashing services. Additionally, the suspicious persons database 112 includes records of customers, check presenters, or check depositors that have demonstrated some sort of suspicious behavior or suspicious activity. In another aspect, the suspicious persons database 112 can be utilized to identify and track suspicious behavior or suspicious activity so as to protect retailers, convenience stores, check cashing service locations, gas stations, etc. from suspicious behavior or suspicious activity. Moreover, the transaction processing component 108 may be utilized in conjunction with the suspicious person database 112 to evaluate received transaction requests and determine if suspicious behavior or suspicious activity is occurring. The customer service agent 106 intervenes when suspicious behavior or suspicious activity is suspected by the transaction processing component 108. The scope and functionality of each component will be described in greater detail herein below.

In one embodiment, the transaction processing component 108 may be configured to electronically receive, for example, the previously described transaction requests from the interactive transaction device 102 and process the transaction requests prior to authorization of the financial transaction. In addition, the transaction processing component 108 coordinates evaluation processes of received transaction requests with the customer service agent 106 and the suspicious persons database 112 so as to increase the identification of suspicious behavior or suspicious activity. For example, after receiving a particular transaction request from the interactive transaction device 102, the transaction processing component 108 may search the suspicious persons database (SPD) 112 for matching transaction parameters, such as a name, a social security number, and biometric information including digital photographs or scanned fingerprints. Additionally, it should be appreciated that biometric information may include various data or samples including an image, handprint, voice sample, handwriting sample, iris scan, retina scan, or various other generally known biometric or biomedically implanted information useful for identifying the customer, check depositor, or check presenter. If matching parameters are found to exist, then the transaction processing component 108 may contact the customer service agent 106 for further depositor identification and verification. Subsequently, the customer service agent 106 may re-evaluate the transaction request prior to authorization. The transaction process, including SPD evaluation and agent intervention, will be described in greater detail below.

In general, it will be appreciated that the transaction processing component 108 may comprise, by way of example, computers, program logic, or other substrate configurations representing data and instructions, which operate as described herein. In other embodiments, the transaction processing component 108 may comprise controller circuitry, processor circuitry, processors, general purpose single-chip or multi-chip microprocessors, digital signal processors, embedded microprocessors, microcontrollers, and the like. In addition, it will be appreciated that in one aspect, the program logic may advantageously be implemented as one or more components, wherein the components may advantageously be configured to execute on one or more processors. The components may include, but are not limited to, software or hardware components, modules such as software modules, object-oriented software components, class components and task components, processes methods, functions, attributes procedures, subroutines, segments of program code, drivers, firmware, micro-code, circuitry, data, databases, data structures, tables, arrays, and variables.

Figure 2A:
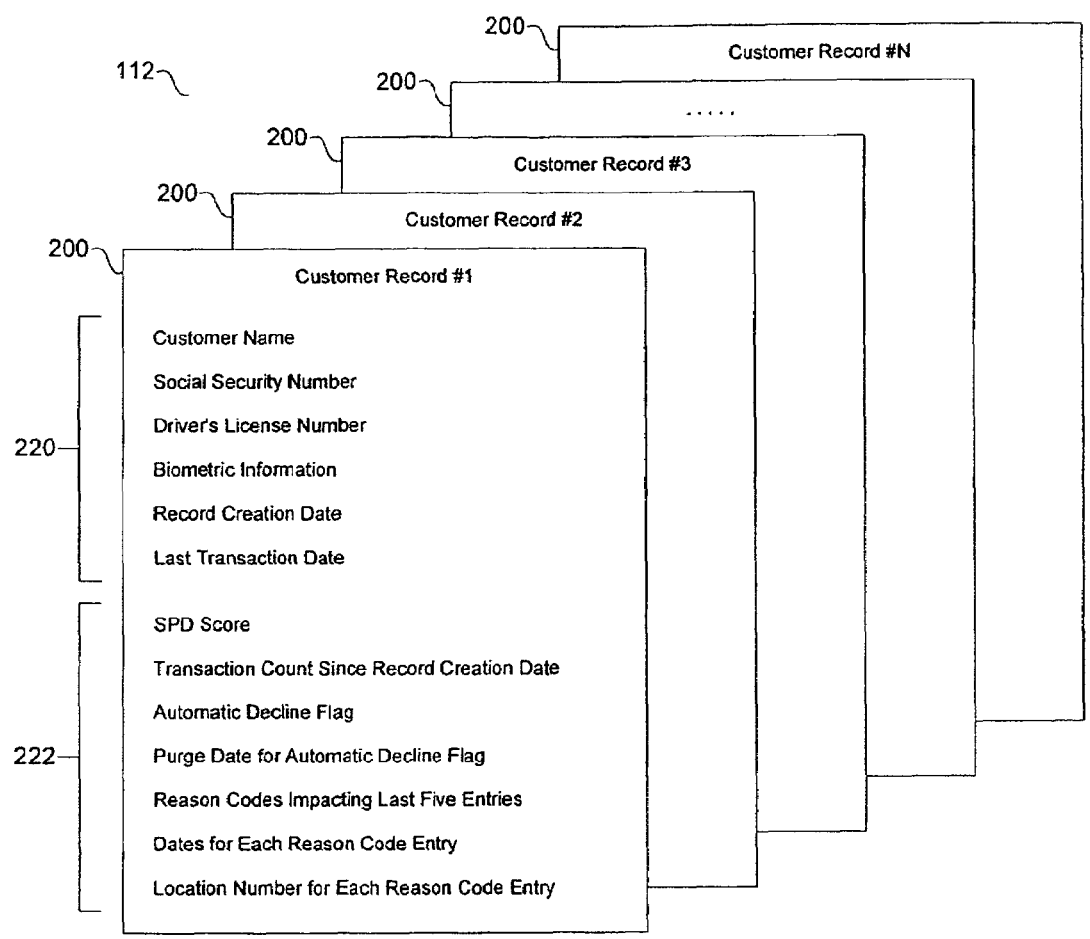
FIG. 2A illustrates one embodiment of the suspicious persons database in FIG. 1 having a plurality of customer related records.

FIG. 2A illustrates one embodiment of a suspicious persons database (SPD) 112 having a plurality of customer records 200 from 1 to N. In one aspect, the customer records 200 document or track the activity of previously encountered customers 100 and may include, but are not limited to, various attributes 220, 222 associated with the previously encountered customers. As illustrated in FIG. 2A, one set of attributes may comprise identification information 220 of registered customers, such as customer name, social security number, driver's license number, biometric information, record creation date, and last transaction date. Another set of attributes may comprise SPD related information 222, such as SPD score, transaction count since record creation date, automatic decline flag, purge date for automatic decline flag, reason codes impacting last five entries, dates for each reason code entry, and location number for each reason code entry. In another aspect, the SPD information 222 tracks or records the suspicious behavior or suspicious activities of particular individuals with the SPD score so as to determine the likelihood that these tracked individuals would repeat suspicious behavior or suspicious activity on future financial transactions. These attributes 220, 222 will be described in greater detail herein below.

Figure 2B:
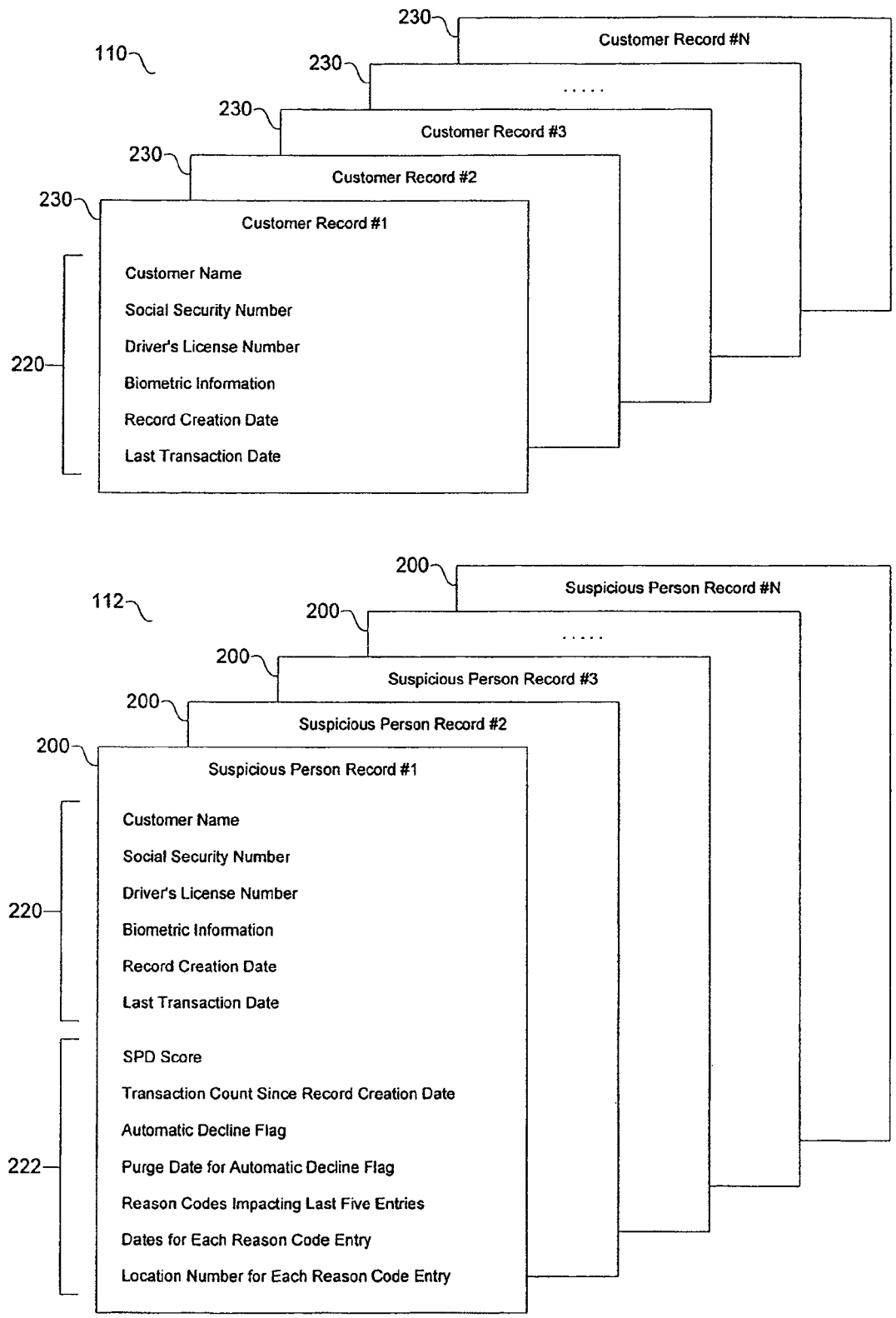
FIG. 2B illustrates another embodiment of the suspicious persons database, wherein a customer record database tracks registered customers and the suspicious persons database tracks suspicious customers.

FIG. 2B illustrates an alternative embodiment of the suspicious person database 112 where customers 100 are separated into two types: suspicious customers and registered customers. In one aspect, suspicious customers are placed in the SPD 112 as described in FIG. 2A, and registered customers 100 are placed in the customer record database (CRD) 110 in a similar format. The customer record database 110 may comprise a plurality of records 230 from 1 to N with attributes associated with identification information 220. In addition, the customer record database 110 may comprise a historical transaction database for registered customers. If one of these customers demonstrates suspicious behavior or suspicious activity, then that customer may be added to the SPD 112. Moreover, the SPD score will determine if a customer or check presenter 100 is active (suspicious) or inactive (registered). For example, an SPD score of one or more may be considered active and a score of zero may be considered inactive. This allows for an individual with a potentially high SPD score to reduce the high score after enough positive history has taken place.

As further illustrated in FIGS. 2A, 2B, the records 200 may comprise SPD information 222 corresponding to the automatic decline flag. In one aspect, the automatic decline flag indicates whether or not automatic declines may be issued for future transactions from the marked customer or check presenter. Some registered customers may lose their check cashing privileges for a pre-determined time period due reoccurring suspicious behavior, suspicious activity, or an excessively bad check cashing history. In addition, the SPD information 222 may also comprise a purge date for the automatic decline flag, wherein the automatic decline flag may expire or be manually removed.

As will be described in greater detail herein below, the creation and addition of records to the SPD 112 may occur automatically during either an enrollment process or during any subsequent transaction. Records may also be added manually by the customer service agent 106 at any time before, during, or after subsequent transactions based on failures or suspicious behavior or suspicious activity during an agent validation process or based on agent intuition. Advantageously, the agent intervention process will be shown in FIGS. 3, 4, 6 to offer additional identification of suspicious behavior or suspicious activity.

Also, each type of suspicious behavior or suspicious activity may have a certain number of points associated with it, and those points will be accumulated into an SPD score that may be reflected in each record as illustrated in FIGS. 2A, 2B. In addition, non-suspicious activities, or the reversal or clarification of suspicious indicators, may have associated negative points and may thus reduce or adjust the SPD score in a record such that a lower degree of suspicious behavior or suspicious activity is indicated. It should be appreciated that, in this implementation, a higher SPD score reflects a higher degree of suspicion, and a lower SPD score reflects a lower degree of suspicion. The scoring process as well as examples of point values associated with particular suspicious activities will be described in greater detail herein below with reference to FIG. 5.

In one embodiment, the customer record database 110 and the suspicious persons database 112 may be implemented using applications designed for relational database development and implementation, such as, for example, those sold by Oracle Corporation or Sybase Corporation. In another embodiment, the databases 110, 112 may comprise a database design implemented using numerous other programming languages such as, for example, JAVA, C/C++, Basic, Fortran, or the like, wherein the database structure, tables, and associations are defined by code of the programming languages. It should be appreciated however, that these languages may also be utilized to develop applications and programs for accessing or manipulating the aforementioned Oracle or Sybase database designs.

Figure 3:
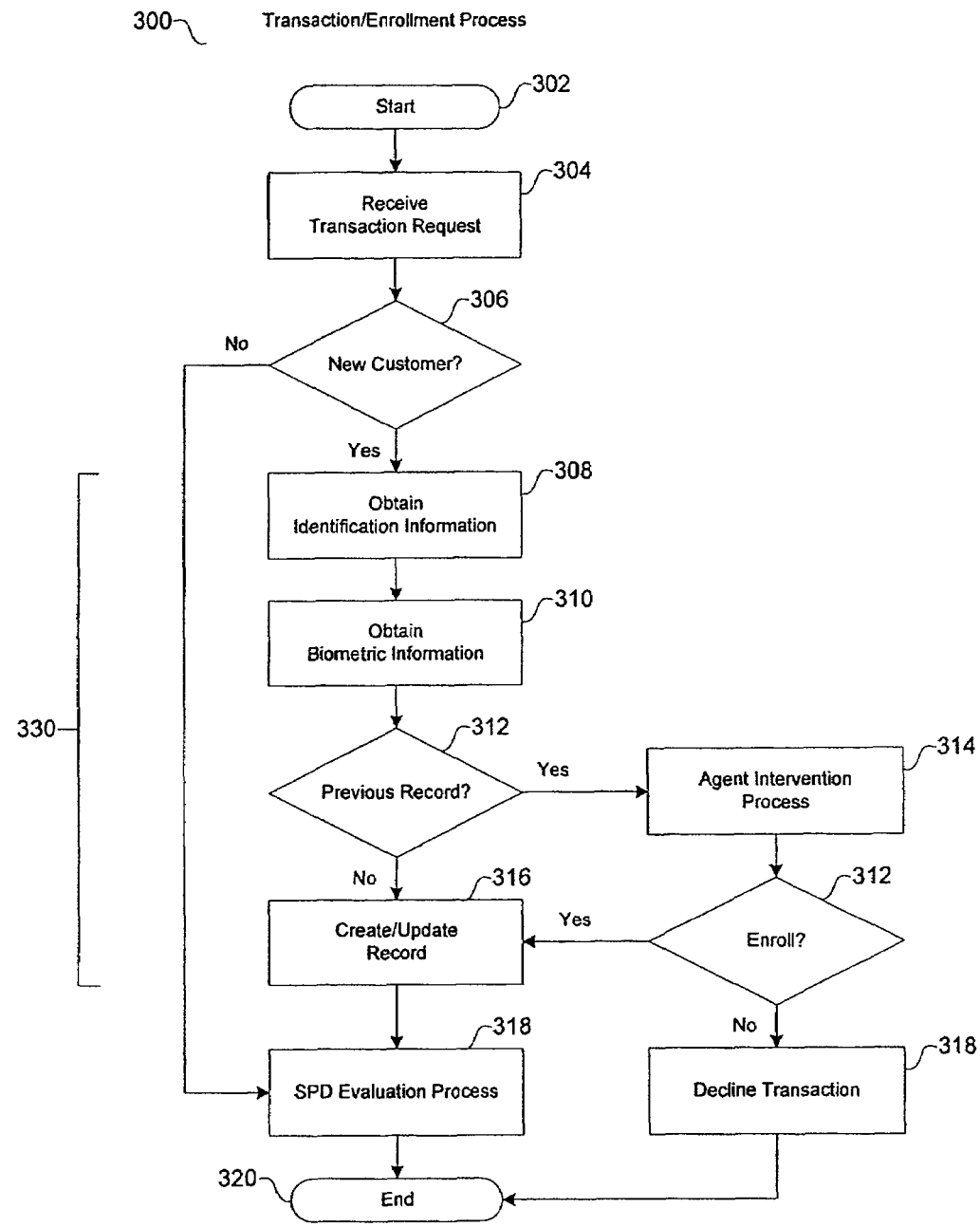
FIG. 3 illustrates one embodiment of a transaction process that may be utilized by the check cashing service in FIG. 1 to create records in the suspicious persons database.

FIG. 3 illustrates one embodiment of a transaction process 300 comprising one example of an enrollment process 330. As previously mentioned, the SPD 112 may be utilized during both the enrollment process 330, for example, a first check transaction, as well as during subsequent check cashing transactions. During enrollment, whenever a new account is requested, for example, when a social security number (SSN) that is not recognizable by the checking service provider 104 is inputted or entered into the interactive transaction device 102, biometric information may be taken at the interactive transaction device 102. The acquired biometric information may be compared to the previously recorded biometric information of registered customers and/or marked individuals in the SPD 112. In one aspect, it should be appreciated that an identification number, such as a social security number, may be needed to distinguish between existing customers and new customers and that any number may be used to identify existing customers without departing from the scope of the present teachings.

It should also be appreciated that the identification number may comprise various other generally known identification numbers, such as a driver's license number, a customer account number, etc., or alpha numeric information, such as the customer's name, without departing from the scope of the present teachings. Additionally, the customer 100 may be required to input additional identification information, such as a pin number, zip code, telephone number, mother's maiden name, etc., into the interactive transaction device 102 so as to further validate the customer's identity prior to transaction approval.

The transaction process 300 initiates in a start state 302 and proceeds to a state 304. In the state 304, the checking service provider 104 receives a transaction request comprising, in one embodiment, an identification number, such as a social security number, and other details relating to the financial transaction from the interactive transaction device 102 via the transaction processing component 108. The customer 100 may initiate the requested transaction by inputting the identification number into the interactive transaction device 102 via an interactive keyboard or key punch pad. As previously described, one or more requested financial transactions may involve using the interactive transaction device 102 to cash or deposit a paper drafted check, such as a payroll check, from a customer or depositor in exchange, for example, a cash withdrawal. It should be appreciated that the transaction request may be transferred electronically to the transaction processing component 108 via the internet, a telephone system, wireless modem, or other various electronic mechanisms of transit without departing from the scope of the present teachings.

Next, in a decision state 306 that follows, the transaction processing component 108 preprocesses the received identification number by comparing the identification number of the current customer 100 to previously stored identification numbers in the CRD 110 or the SPD 112. If the transaction processing component 108 determines that a new account is being requested, because a match is not found, then the process 300 advances to a state 308 to initiate the enrollment process 330. Otherwise, if the transaction processing component 108 determines that the current customer 100 is an existing customer in the CRD 100 or the SPD 112, due to a matched identity in the CRD 110 or the SPD 112, then the process 300 advances to a state 318 where an SPD evaluation process is performed in a manner as described herein below with reference to FIG. 4.

States 308 through 316 described one embodiment of the enrollment process 330. It should be appreciated that the enrollment process 330 may take place at the interactive transaction device 102, directly with the checking service provider 104, or in one of the financial institutions 122, 124 without departing from the scope of the present teachings. It should also be appreciated that a record may created for every customer in the CRD 110, and suspicious customers, that are first recorded in the CRD 110, may be placed in the SPD 112 following any suspicious behavior or suspicious activity that results in an SPD score above zero.

In the state 308, the transaction processing component 108 acquires or obtains identification information 220 from the current customer 100 using various data acquisition components in a manner as previously described with reference to FIG. 1. In one aspect, a paper drafted check submitted by the current customer 100 for depositing or cashing may be used as source information to generate transaction information relating to the customer 100 and the financial transaction. For example, the current customer 100 may run the paper drafted check through a data acquisition device, such as a MICR reader or image scanner, positioned on the interactive transaction device 122 to generate the transaction information. Alternatively, the current customer 100 may use a computing device, such as a personal computer (PC) in combination with a keyboard and the data acquisition device, positioned on the interactive transaction device 102 to generate the transaction information.

Next, in a state 310, biometric information as previously described herein may be acquired from the current customer 100 in a manner as previously described herein and included as part of the transaction information. In one aspect, it should be appreciated that the transaction information including acquired biometric information of the current customer 100 may be stored by the checking service provider 104 in a memory component, such as the CRD 110 or the SPD 112, and accessed whenever a particular customer requests approval for a financial transaction.

Next, in a decision state 312, the transaction processing component 108 compares the acquired biometric information to previously stored biometric information in the SPD 112 using, for example, pattern recognition software or various other generally known digital image processing software. In addition, the transaction processing component 108 may also use the other acquired identification information to search the CRD 110 or SPD 112 for repeat entries. In the decision state 312, if in formation in one or more searched records 200 are found not to match or the SPD biometric information of the current customer 100 fails to match an existing SPD biometric information, then the transaction process 300 advances to a state 316. In the state 316, a new account or record 200 corresponding to the current customer 100 may be established in the CRD 110 or the SPD 112.

In one embodiment, creating a record 200 may include storing related identification information including digitized biometric information in the CRD 110 or the SPD 112 so as to protect the identity of the new members. It should be appreciated that, when a new record is created, default SPD information 222 including a default SPD score may be imposed so as to reflect an inactive SPD status, wherein the default SPD score may be zero. The records 200 may be created in a manner as previously described with reference to FIGS. 2A, 2B.

Otherwise, if one or more searched SPD records 200 are found to match the new account information of the current customer 100 or the SPD biometric information of the current customer 100 matches an existing SPD biometric information, then the process 300 advances to a state 314 where the agent intervention process is performed. In the state 314, the transaction processing component 108 may contact the customer service agent 106 for further transaction evaluation so as to identify the proper identity of the current customer 100.

Advantageously, the customer service agent 106 may physically re-assess the SPD score or verify the identity of the current customer 100. If a similar biometric information is determined to exist, then the agent 106 may conclude, for example, that the reason for suspicious behavior or suspicious activity is related to an existing customer 100 attempting to establish an additional account or membership. If suspicious behavior or suspicious activity is triggered by an additional account request, then the agent 106 may increase the SPD score of the existing customer to reflect the suspicious behavior or suspicious activity. In many cases, multiple enrollments from the same person may be blocked, and each new account request may result in an entry to the SPD 112.

In addition, subsequent transactions relating to suspicious behavior or suspicious activity may require particular handling procedures such that transactions with an active SPD entry may be routed to the customer service agent 106, the majority of which may be handled by the customer service agent 106 without speaking to the customer or depositor at the interactive transaction device 122. Advantageously, agent 106 intervention may be used to further validate the identity of the current customer 100 and the legitimacy of the transaction in a manner so as to further identify suspicious behavior or suspicious activity. Agent intervention involving subsequent transactions will be described in greater detail herein below with reference to FIG. 4.

Next, in a decision state 312, if suspicious behavior or suspicious activity is suspected by the agent 106, then enrollment may be refused, and the transaction is declined in a state 318. Following declination of the transaction, the process terminates in an end state 320. Otherwise, if the agent 106 determines in the state 312 that the current customer 100 is legitimately trying to establish a new account, then the process advances to the state 316 to create a record in the CRD 110 or the SPD 112 for the current customer 100.

In some cases, the agent 106 may determine that the current customer 100 is listed on an existing account with an associate, such as a relative, friend, or business. In this particular case, the agent 106 may allow the current customer 100 to proceed with the transaction using the existing account as a listed associate, or the agent 106 may allow the current customer 100 to create a new account in the state 316. Advantageously, the agent intervention process in the state 314 allows the customer service agent 106 to make more flexible decisions based on information previously known and stored in the CRD 110 or the SPD 112 so as to resolve problems encountered at the interactive transaction device 102.

Subsequent to the state 316, the process 300 advances to the state 318 where the SPD evaluation process is performed in a manner as described herein below with reference to FIG. 4. After completing the SPD evaluation process in the state 318, the transaction process 300 terminates in an end state 320.

Advantageously, the above-mentioned transaction process 300 represents a significant improvement over traditional check handling procedures by preprocessing transactions to determine whether suspicious behavior or suspicious activity is occurring or is likely to occur. In particular, identification information including biometric information may be compared to previously recorded identification information and biometric information in a manner so as to validate identity of suspicious individuals. In addition, SPD 112 information may be applied to current and future financial transactions in a manner so as to utilize prior knowledge of suspicious behavior or suspicious activity for efficient identification of suspicious individuals, which promotes substantially faster closing, balancing, and settlement of financial transactions.

Figure 4:
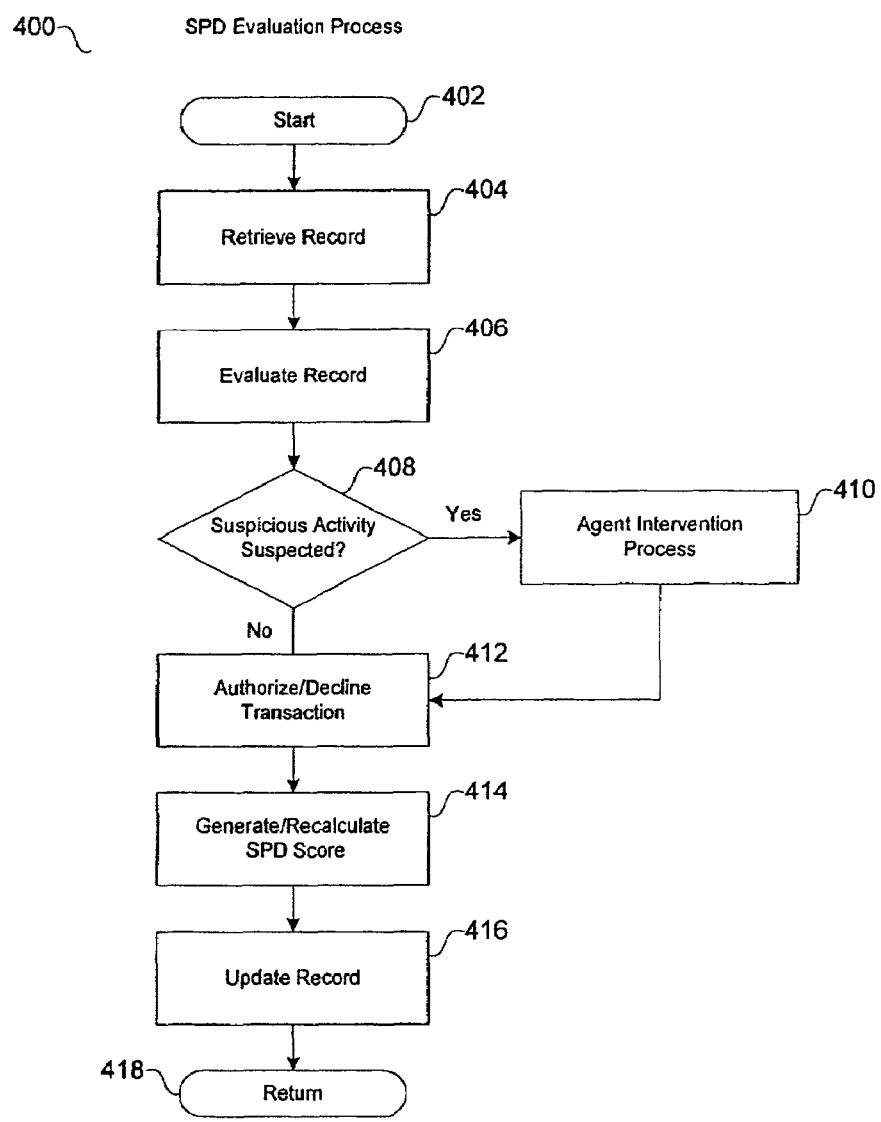
FIG. 4 illustrates one embodiment of an evaluation process that may be used by the check cashing service in FIG. 1 in conjunction with the suspicious persons database in FIG. 2 to identify suspicious behavior or suspicious activity using a transaction processing component.

FIG. 4 illustrates one embodiment of an SPD evaluation process 400. As illustrated, the SPD evaluation process 400 functionally describes the utilization of the SPD 112 by the checking service provider 104 to identify suspicious behavior or suspicious activity. Advantageously, transaction information, identification information, SPD scores, and biometric data may be utilized, at least in part, to identify marked individuals that may be associated with suspicious behavior or suspicious activity in past transactions. In addition, suspicious customers may be blocked from further transactions in a manner as will be described herein below. Moreover, low and moderately suspicious financial transactions may be approved and highly suspicious financial transactions declined in a manner such that the approved or declined status may be based on the customer's check cashing history, SPD score, or some other factor relevant to the transaction assessment.

The SPD evaluation process 400 initiates in a start state 402 and then proceeds to a state 404 where the transaction processing component 108 retrieves the current customer's record from the CRD 110 or the SPD 112. Next, the process advances to a state 406 where the transaction processing component evaluates the retrieved record. In one aspect, evaluation methods may include, for example, verifying the customer's name, SSN, and account number with the financial institution indicated on the customer's check. During the process of validating the identification information in the state 402, the transaction processing component 108 evaluates the SPD information 222 including the SPD score relating to the current customer 100. The SPD information 222 including the SPD score may then be used by the transaction processing component 108 to determine the degree of suspicion related to the transaction and whether to authorize or decline the transaction. As will be described in greater detail herein below, the SPD scores may fall into three general degrees of suspicion, including a degree of low, moderate, and high suspicion.

Next, in a decision state 408, if the transaction processing component 108 determines, based on the SPD score, that the transaction is of low suspicion, then the process 400 advances to a state 412, where most of the transactions relating to the degree of low suspicion may be authorized by the checking service provider 104. In some cases, the transaction may be declined in the state 412 by the transaction processing component 108 based on a high SPD score or if the automatic decline flag is active. In other cases, the transaction processing component 108 may decline financial transactions in the state 412 for the customer 100 if the transaction processing component 108 determines that the customer 100 is currently engaging in suspicious behavior or suspicious activity. Alternatively, in the decision state 410, if the transaction is of moderate or high suspicion, then the process 400 advances to a state 410, where the agent intervention process is performed.

In one embodiment, prior to sending the transactions to the customer service agent 106, the transaction processing component 108 may attempt to validate the submitted transaction information. Some examples of transaction information validation include, but are not limited to, validating the checking information, validating the check type including payroll checks, company checks, business checks, and personal checks, validating the check amount, validating the endorsement/signature on back of the check, confirming that the payee name on the check matches the name on the check casher's account, comparing acquired biometric information with existing biometric information in the SPD 112, and ensuring that the MICR line and other areas of the check do not appear to be altered.

In some cases, if the customer 100 is attempting to cash a payroll check, the transaction processing component 108 may attempt to confirm with the check issuer's financial institution 124 that the submitted check is valid. The transaction processing component 108 may also attempt to verify that sufficient funds exist in the check issuer's financial institution. It should be appreciated that various verification methods may be used to verify the received identification information so as to determine validity of the transaction without departing from the scope of the present teachings.

In the state 410, FIG. 4 further illustrates one embodiment of an agent intervention process that may be used by the checking service provider 104 to resolve problems associated with suspicious transactions. If triggering of suspicious behavior or suspicious activity occurs in a manner as previously described, then the transaction processing component 108 may contact the customer service agent 106 for further transaction evaluation so as to identify the proper identity of the current customer 100. Advantageously, the customer service agent 106 may physically re-assess the SPD score or verify the identity of the current customer 100.

Additionally, in the state 410, the customer service agent 106 may attempt to verify the identity of the current customer 100 by obtaining the transaction information, the CRD 110 information, or the SPD 112 information and then researching the suspicious behavior or suspicious activity indicated by the transaction processing component 108. In one aspect, the customer service agent 106 may obtain current biometric information from the current customer at the interactive transaction component 102 and compare the received biometric information of the current customer 100 with previously recorded CRD 110 or SPD 112 biometric information. If similar biometric information is determined to exist, then the agent 106 may determine, for example, if the reason for suspicious behavior or suspicious activity is related to an existing customer 100 attempting to establish an additional account or membership. If suspicious behavior or suspicious activity is triggered by an additional account request, then the agent 106 may increase the SPD score to reflect the suspicious behavior or suspicious activity to thereby block the financial transaction and the additional account request.

Moreover, the customer service agent 106 may also attempt to validate the transaction information, such as an account number, check date, check amount, etc., and, if discrepancies arise, the agent 106 may score the suspicious behavior or suspicious activity accordingly. Next, the agent 106 may evaluate the SPD information 222 including the SPD score of the current customer 100 so as to determine the degree of suspicion related to the transaction in a manner as previously described. Following, if the degree of suspicion or the SPD score is determined to be acceptable then the transaction may be authorized in the state 412. Otherwise, the transaction may be declined in the state 412 based on a high SPD score or if the automatic decline flag is active. In other cases, the customer service agent 106 may raise the SPD score of the current customer 100 if the customer service agent 106 determines that the customer 100 is currently engaging in some sort of suspicious behavior or suspicious activity.

Advantageously, the agent intervention process in the state 410 may be utilized to further identify suspicious behavior or suspicious activity. For example, the above-mentioned transaction process 300, in conjunction with the SPD evaluation process 400 and the agent intervention process 410, utilizes an efficient and selective mechanism for evaluating suspicious behavior or suspicious activity at the interactive transaction device 102. In one aspect, if suspicious situations arise, the above-mentioned checking service provider 104 selectively evaluates transactions by comparing the transaction information with records 200 stored in the CRD 110 or the SPD 112. As a result, financial transactions may be completed, balanced, and settled in a more confident manner such that the customer 100 is moderately inconvenienced and the checking service provider 104 reduces returned check rates. Hence, financial transactions utilizing the suspicious persons database 112 benefit from more efficient identification of suspicious behavior or suspicious activity.

Following the decision state 408 or the agent intervention state 410, the SPD score 112 is re-calculated to reflect suspicious behavior or suspicious activity, transaction success, or transaction failure in a state 414. The SPD score may increase if the transaction fails to clear, or the SPD score may decrease if the transaction proves successful. In one aspect, once a individual's SPD score reaches a pre-set threshold of moderate or high suspicion, the transaction processing component 108 may record the results of the individual's check cashing transactions in the suspicious persons database 112, including archiving biometric information of the individual, and customer service agent intervention may then be required to proceed with the requested financial transaction. In other circumstances, if the SPD score reaches a degree of high suspicion, the transaction processing component 108 may decline the transaction and temporarily discontinue the individual's check cashing membership and privileges. The SPD scoring process will be described in greater detail in FIG. 5.

Following the SPD score re-calculation in the state 414, the SPD 112 is updated in a state 416 to reflect the re-calculated score, which may result in positive or negative marks corresponding to the customer 100 for future transactions. As previously described, reducing an SPD score below a predetermined threshold may result in an existing customer with a previously moderate or high SPD score being removed from an active SPD status in the SPD 112. In another embodiment, if the updated SPD score results in an active SPD score, such as an SPD above zero, then the current customer 100 may be added to the SPD 112 based on this particular incident or event of suspicious behavior or suspicious activity.

It should be appreciated by one skilled in the art that there are many events that may result in the creation of an SPD record during transaction evaluation. Triggering events may include the failure of social security number validation routines, the failure of driver's license number validation routines, and the failure of credit header validation routines. Moreover, another event may include a check type mismatch after the enrollment process has been completed. For example, the customer or depositor indicated that the check comprised a payroll check, but, upon validation, the deposited check was determined to comprise a personal check or business check. Still another event may include whether the indicated check date is significantly incorrect. For example, an improper check date may include postdated checks and dates more than six months old.

Furthermore, other events that may result in the creation or addition of an SPD record during a transaction may include check amount mismatch, for example, the amount indicated on the check is different than the amount inputted by the customer. Also, fraudulent endorsements may qualify as an event, where, for example, a line in the endorsement line is designed to fool the kiosk OCR. Still other events may include magnetic ink not detected, altered MICR number, altered payee or check amount, and payroll check identified as stolen, stop pay, or already cashed by the check issuing financial institution.

After updating the SPD 112 in the state 416, the process 400 advances to the state 418, where the SPD evaluation process 400 returns to the transaction/enrollment process 300 of FIG. 3. Advantageously, the transaction validation process 400 may be utilized by the checking service provider 104 to score transactions based on the validity of the received transaction information, including identification information, from a customer 100. By verifying the identity of the customer 100, a degree of suspicion may be evaluated, fraudulent transactions may be avoided, and suspicious behavior or suspicious activity may be recorded in the SPD 112 for future transactions involving the customer 100. Moreover, the customer service agent 106 may be involved to further address suspicious behavior or suspicious activity so as to perform a secondary analysis pertaining to moderately suspicious customers in a manner as previously described.

Figure 5:
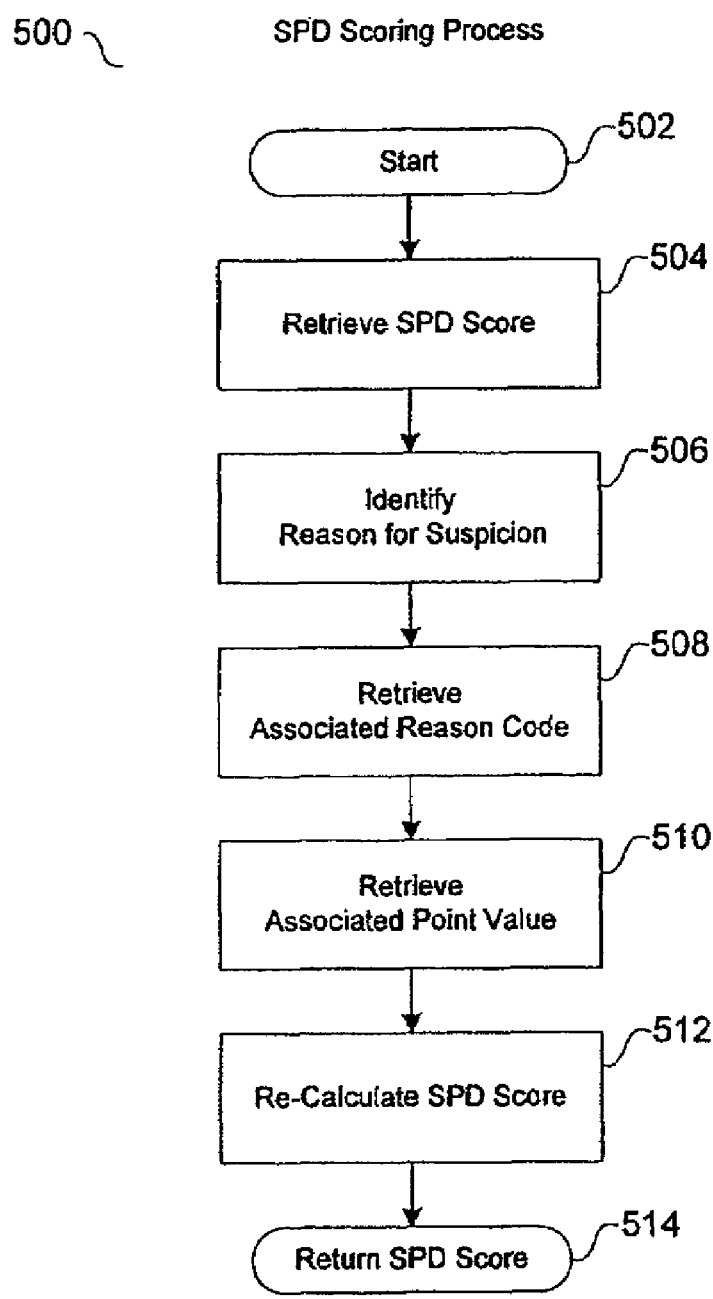
FIG. 5 illustrates one embodiment of a scoring process that may be used by the check cashing service in FIG. 1 in conjunction with the suspicious persons database to score suspicious behavior or suspicious activity.

FIG. 5 illustrates one embodiment of a SPD scoring process 500 that may be used by the transaction processing component 108 to generate a SPD score indicative of the level or degree of suspicion relating to a particular customer or financial transaction involving the particular customer. The SPD scoring system allows the customer service agent 106 or the transaction processing component 108 to assign both positive and negative points to an individual based on behavior during previous and current transactions. This allows the checking service provider 104 to add individuals based on incidents of suspicious behavior or suspicious activity or remove individuals from the suspicious person database 110 if sufficient positive points have been accumulated through subsequent transactions to offset any negative suspicious behavior or suspicious activity. However, once an individual is removed from the SPD 112, the individual may be added in the future if there is further demonstration of suspicious behavior or suspicious activity. Alternatively, this procedure also allows the customer service agent 106 or the transaction processing component 108 to add points to the individual's total if there is more suspicious behavior.

The SPD scores may fall into three general fields of suspicion, including a degree of low suspicion, moderate suspicion, and high suspicion. Most transactions relating to the degree of low suspicion may be approved. Although, once an individual's SPD scoring point value reaches a pre-set threshold of moderate suspicion, the checking service provider 104 may record the results of the individual's check cashing transactions in the SPD 112, including archiving biometric information of the individual, and customer service agent intervention may then be required to proceed with the requested financial transaction. In one embodiment, a low degree of suspicion may comprise an SPD score below 10 points, a moderate degree of suspicion may comprise an SPD score between 10 and 15 points, and a high degree of suspicion may comprise and SPD score of above 15 points. It should be appreciated that the point values associated with the degrees of suspicion may be altered by one skilled in the art without departing from the scope of the present teachings.

If the SPD scoring point value reaches a degree of high suspicion, the checking service provider 104 may temporarily discontinue the individual's check cashing membership and privileges. In one embodiment, that particular individual's biometric information or various other identification information may remain in the SPD 112 and be compared to new registrants during, for example, enrollment so as to determine if the temporarily discontinued member is trying to commit fraud under a new or different check cashing membership. It should be appreciated that entry of identifying items into the SPD 112 may occur on a real-time basis, including the accumulation of positive and negative points and comparison of new member applicant biometrics to those already residing in the SPD 112.

In one aspect, a table may be created with each of the suspicious reason codes and the points associated with each activity. These point values may be stored in a table or various other database configurations so that the points may easily be modified when new SPD information or additional identification information becomes available. In another aspect, whenever the SPD score in a record is zero, the record may be considered inactive, wherein the inactive state allows for an individual to overcome a relatively high SPD score after enough positive history has taken place. In some situations, events with negative scores, for example, transactions that indicate a reduced level of risk, may not reduce the SPD score below zero. Also, in most cases, it should be appreciated that customer service agent 106 intuition may not be permitted to reduce a transaction SPD score below a value of one. One example of a validation scoring table is provided below. Note that the points associated with each reason code may be adjusted based on future suspicious behavior or suspicious activity. It should be appreciated that the below indicated SPD points may be altered by one skilled in the art without departing from the scope of the present teachings.

| Reason Code | Description | SPD Points |
|---|---|---|
| 10 | Operator intuition | 1-20 |
| 11 | Photo matches another account - attempt to open multiple accounts | 20 |
| 12 | SSN validation failure | 20 |
| 13 | DL validation failure | 20 |
| 14 | Mod 10 validation failure | 20 |
| 15 | Credit header validation failure | 20 |
| 16 | Check type mismatch - high risk - for example, personal check tried to cash as payroll | 15 |
| 17 | Other check type mismatch - for example, company check identified as payroll | 7 |
| 18 | Postdated check | 5 |
| 19 | Check date mismatch - postdated check | 7 |
| 20 | Check date mismatch by more than one week | 10 |
| 21 | Fraudulent endorsement | 15 |
| 22 | Magnetic ink not detected | 20 |
| 23 | Altered MICR | 15 |
| 24 | Altered payee | 15 |
| 25 | Altered check amount | 20 |
| 26 | Lost, stolen, stop pay, or already cashed in positive pay file | 20 |
| 27 | Item does not exist in positive pay file | 0 |
| 28 | Photo problem | 5 |
| 110 | Operator intuition - low risk factors | −1 through −5 |
| 111 | Successful transaction | −1 |
| 112 | Credit header successfully validated | −15 |
| 113 | Photo problem resolved - for example, if | −16 |

-continued

| Reason Code | Description | SPD Points |
|---|---|---|
| | transaction repeated | |
| 114 | Check date mismatch corrected if identical transaction repeated | −2 |
| 115 | Check type mismatch corrected if identical transaction repeated | −5 |
| 116 | Positive pay error confirmed to be legitimate transaction | −19 |
| 117 | DL validation failure confirmed to be a legitimate DL number | −19 |

Advantageously, SPD scores relating to financial transactions offer an innovative method of identifying suspicious behavior or suspicious activity. If suspicious behavior or suspicious activity or situations arise, the above-mentioned SPD scores may allow the checking service provider 104 to determine in advance, for example, whether a customer 100 has a proven history of suspicious behavior or suspicious activity. Additionally, the SPD scores may be applied to a particular financial transaction in a manner so as to efficiently identify suspicious behavior or suspicious activity. Furthermore, SPD scores may be utilized to avoid likely fraudulent based rejections. In particular, SPD scores may be applied to current and future financial transactions in a manner so as to utilize prior knowledge of suspicious behavior or suspicious activity of documented customers to identify suspicious behavior or suspicious activity during transactions.

As illustrated in FIG. 5, the SPD scoring process 500 initiates in a start state 502 and then proceeds to a state 504, where the transaction processing component 108 retrieves the current customer's SPD score from the SPD database 112. Next, the transaction processing component 108 identifies the reason for suspicion or discrepancies. For example, discrepancies in the transaction information may include, but are not limited to, invalid identification data, such as social security number, driver's license number, account number, ABA number, and biometric information. If reasons for suspicion or discrepancies in the received transaction information are identified, then the transaction processing component 108 retrieves the associated reason code from the previously mentioned reason code list in a state 508. As previously mentioned, the reason codes have associated point values indicative of the severity of the suspicion, which may increase the SPD score according to the reason code points. Otherwise, if the transaction information is verified or determined correct, then the transaction processing component 108 may decrease the SPD score according to the previously indicated reason code points. In a state 510, the reason code points are retrieved and, in a state 512 the SPD score is re-calculated so as to reflect transaction success or failure. Following, the SPD score is returned in an end state 514.

Advantageously, the SPD scoring process 500 may be utilized by the checking service provider 104 to score transactions based on the validity of the received transaction information, including identification information, from the customer 100. By verifying the identity of the customer, a degree of suspicion may be evaluated, fraudulent transactions may be avoided, and suspicious behavior or suspicious activity may be recorded in the SPD 112 for future transactions involving the customer 100. It should be appreciated that the SPD scoring process 500, as described herein, may be applied to the customer or financial transaction by the various components of the checking service provider 104 including the customer service agent 106 and the transaction processing component 108 without departing from the scope of the present teachings. In addition, a plurality of generated SPD scores may be recorded in the SPD 112 and referenced during future transactions as needed to identify suspicious behavior or activity. It should also be appreciated that the various components of the above-mentioned table as referenced by the description of FIGS. 2A, 2B may be used in conjunction with the SPD scoring process 500 without departing from the scope of the present teachings.

Figure 6:
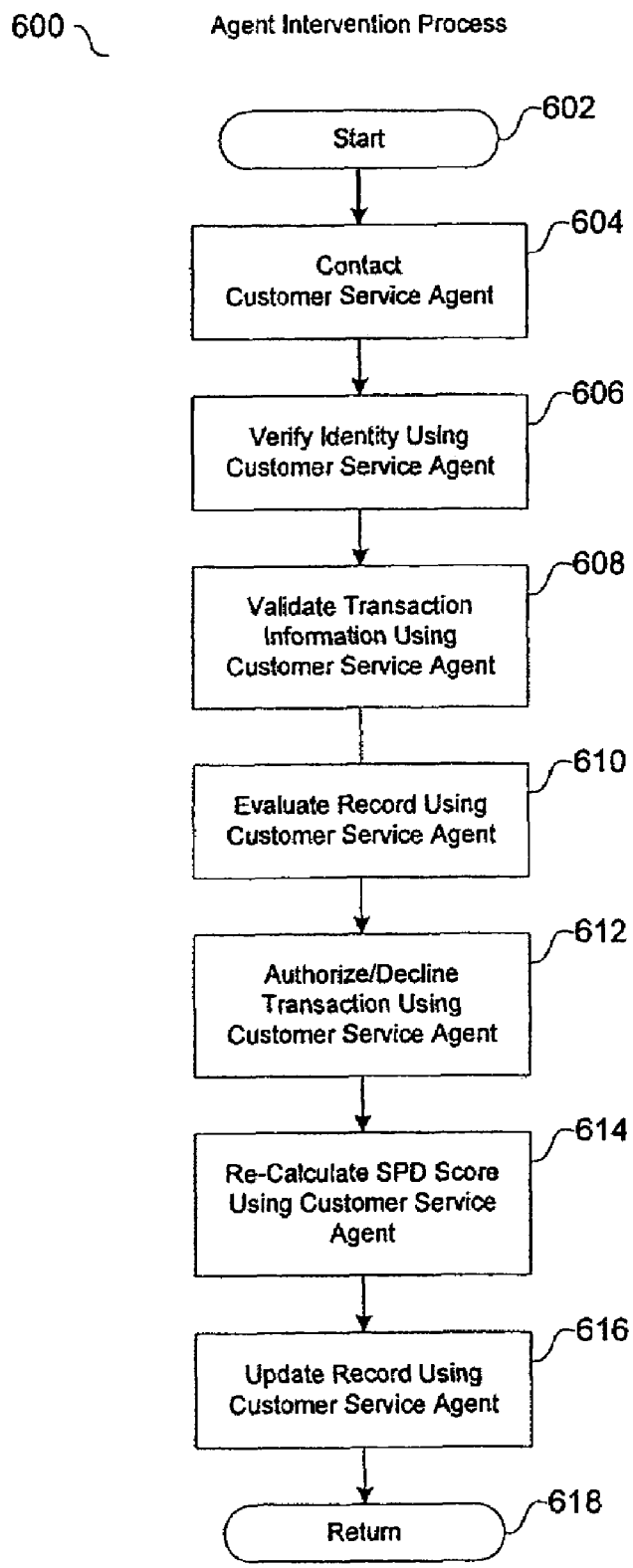
FIG. 6 illustrates one embodiment of an agent intervention process that may be used by the check cashing service in FIG. 1 in conjunction with the suspicious persons database to identify suspicious behavior or suspicious activity.

FIG. 6 illustrates one embodiment of an agent intervention process 600 that may be used by the checking service provider 104 in FIG. 1 in conjunction with the suspicious persons database 112 to identify suspicious behavior or suspicious activity. The agent intervention process 600, such as the process described with reference to state 410 in FIG. 4, may be used by the checking service provider 104 to resolve problems associated with suspicious transactions. If triggering of suspicious behavior or suspicious activity occurs in a manner as previously described, then the transaction processing component 108 may contact the customer service agent 106 for further transaction evaluation so as to identify the proper identity of the current customer 100. Advantageously, the customer service agent 106 may physically re-assess the SPD score or verify the identity of the current customer 100.

In one embodiment, the agent intervention process 600 initiates in a start state 602 and then proceeds to a state 604, where the customer service agent 106 is contacted, for example, by the interactive transaction device 102. The customer service agent 106 may be contacted when the interactive transaction device 102 determines a predetermined level of suspicious behavior or suspicious activity by the customer 100 during a financial transaction. Next, in a state 606, the customer service agent 106 verifies the identity of the customer 100 by, for example, comparing the transaction information provided by the customer 100 to the information provided by the customers financial institution 122. Subsequently, in a state 608, the customer service agent 106 validates the transaction information provided by the customer 100 during the financial transaction. In a state 610, the customer service agent 106 evaluates the customer's record 200 so as to determine, for example, if suspicious behavior or suspicious activity is occurring.

In one embodiment, the customer service agent 106, in the state 610, may attempt to verify the identity of the current customer 100 by obtaining the transaction information, the CRD 110 information, or the SPD 112 information and then researching the suspicious behavior or suspicious activity indicated by the transaction processing component 108. For example, the customer service agent 106 may obtain current biometric information from the current customer at the interactive transaction component 102 and compare the received biometric information of the current customer 100 with previously recorded CRD 110 or SPD 112 biometric information. If similar biometric information is determined to exist, then the customer service agent 106 may determine, for example, if the reason for suspicious behavior or suspicious activity is related to an existing customer 100 attempting to establish an additional account or membership. In one aspect, if suspicious behavior or suspicious activity is triggered by an additional account request, then the agent 106 may increase the SPD score in a following state to reflect the suspicious behavior or suspicious activity to thereby block the financial transaction and the additional account request.

Additionally, in a state 612, the customer service agent 106 authorizes or declines the financial transaction based at least in part on the record evaluation and/or the transaction information. Then, in a state 614, the customer service agent 106 can recalculate the SPD score to update the suspicious person's database 112 for the current financial transaction and/or subsequent financial transactions relating to the customer 100. Next, in a state 616, the customer service agent 106 can update the customer's record 200 in a manner so as to reflect aspects of the current financial transaction including record evaluation, authorization or decline of the current financial transaction, and any recalculated SPD scores. Subsequently, in an end state 616, the agent intervention process 600 terminates.

Advantageously, the customer service agent 106 may physically re-assess the SPD score or verify the identity of the current customer 100 using biometric information during the agent intervention process 600. For example, if similar biometric information is determined to exist, then the agent 106 may decline the current financial transaction due to an existing customer 100 attempting to establish an additional account or membership. In addition, if suspicious behavior or suspicious activity is triggered by an additional account request, then the customer service agent 106 may increase the SPD score of the existing customer to reflect the suspicious behavior or suspicious activity. In many cases, multiple enrollments from the same person may be blocked, and each new account request may result in an entry to the SPD 112. In another example, the customer service agent 106 may determine that the current customer 100 already has a valid account unbeknownst to the current customer 100, such as a husband and wife account, and, thus, informs the current customer 100 via the interactive transaction device 102. Hence, the customer service agent 106 can readily solve problems or redirect seemingly suspicious transactions as they occur depending on the situation encountered.

Although the following description exemplifies one embodiment of the present teachings, it should be understood that various omissions, substitutions, and changes in the form of the detail of the apparatus, system, or method as illustrated as well as the uses thereof, may be made by those skilled in the art, without departing from the spirit of the present teachings. Consequently, the scope of the present teachings should not be limited to the disclosed embodiments, but should be defined by the appended claims.

What is claimed is:

1. A method of processing financial transactions, the method comprising:
    acquiring transaction information associated with one or more financial transactions associated with an entity;
    identifying one or more validation errors in the transaction information wherein the validation errors comprise at least one of the group consisting of amount mismatch, fraudulent endorsement, magnetic ink not detected, altered magnetic ink recognition number, altered payee, negotiable instrument identified as stolen, negotiable instrument identified as stop pay, negotiable instrument identified as already cashed, Mod 10 validation failure, credit header validation failure, negotiable instrument type mismatch, postdated negotiable instrument, negotiable instrument date mismatch, and negotiable instrument does not exist in positive pay file;
    calculating a suspicious activity score based at least in part on the validation errors such that the suspicious activity score is indicative of a level of suspicion associated with the one or more financial transactions performed by the entity; and
    authorizing the current financial transaction based at least in part on whether the one or more validation errors are acceptable.

2. The method of claim 1, further comprising storing the suspicious activity score in a database wherein the database associates the suspicious activity score with the entity.

3. The method of claim 1, further comprising modifying the suspicious activity score based at least in part on the one or more validation errors in the transaction information associated with a current financial transaction.

4. The method of claim 1, wherein processing financial transactions comprises cashing a paper drafted check.

5. The method of claim 1, further comprising acquiring identification information about the entity.

6. The method of claim 5, wherein the identification information about the entity comprises at least one of the group consisting of a name, social security number, a driver's license number, and biometric information.

7. An apparatus for processing financial transactions, the apparatus comprising:
    a processing component that is configured to receive transaction information relating to one or more financial transactions associated with an entity, the processing component further configured to identify one or more validation errors in the transaction information, wherein the validation errors comprise at least one of the group consisting of amount mismatch, fraudulent endorsement, magnetic ink not detected, altered magnetic ink recognition number, altered payee, negotiable instrument identified as stolen, negotiable instrument identified as stop pay, negotiable instrument identified as already cashed, Mod 10 validation failure, credit header validation failure, negotiable instrument type mismatch, postdated negotiable instrument, negotiable instrument date mismatch, and negotiable instrument does not exist in positive pay file,
    wherein the processing component is further configured to calculate a suspicious activity score based at least in part on the validation errors such that the suspicious activity score is indicative of a level of suspicion associated with the one or more financial transactions performed by the entity, and
    wherein the processing component authorizes the financial transaction based at least in part on whether the one or more validation errors are acceptable.

8. The apparatus of claim 7, further comprising a database wherein the database associates the suspicious activity score with the entity.

9. The apparatus of claim 7, wherein the processing component is further configured to modify the suspicious activity score based at least in part on the one or more validation errors in the transaction information associated with a current financial transaction.

10. The apparatus of claim 7, wherein the one or more financial transactions involve cashing a check.

11. The apparatus of claim 7, wherein the transaction information comprises information on the check.

12. The apparatus of claim 7, wherein the processing component acquires identification information about the entity.

13. The apparatus of claim 12, wherein the identification information about the entity comprises acquiring at least one of the group consisting of a name social security number, a driver's license number, and biometric information.

* * * * *